US009046380B2

(12) United States Patent
Mori et al.

(10) Patent No.: US 9,046,380 B2
(45) Date of Patent: Jun. 2, 2015

(54) GUIDING APPARATUS, GUIDING METHOD, AND GUIDING PROGRAM PRODUCT

(75) Inventors: Toshihiro Mori, Okazaki (JP); Yuji Sato, Owariasahi (JP)

(73) Assignee: AISIN AW CO., LTD., Aichi-Ken (JP)

( * ) Notice: Subject to any disclaimer, the term of this patent is extended or adjusted under 35 U.S.C. 154(b) by 564 days.

(21) Appl. No.: 13/291,391

(22) Filed: Nov. 8, 2011

(65) Prior Publication Data

US 2012/0136505 A1 May 31, 2012

(30) Foreign Application Priority Data

Nov. 30, 2010 (JP) ................................ 2010-267809

(51) Int. Cl.
*G01C 21/00* (2006.01)
*G01C 21/36* (2006.01)

(52) U.S. Cl.
CPC ........ *G01C 21/3629* (2013.01); *G01C 21/3602* (2013.01); *G01C 21/3655* (2013.01); *G01C 21/3644* (2013.01)

(58) Field of Classification Search
None
See application file for complete search history.

(56) References Cited

U.S. PATENT DOCUMENTS

| | | | | |
|---|---|---|---|---|
| 5,398,189 A | * | 3/1995 | Inoue et al. ................... | 701/437 |
| 5,521,579 A | * | 5/1996 | Bernhard ...................... | 340/438 |
| 5,614,898 A | * | 3/1997 | Kamiya et al. ............ | 340/995.24 |
| 6,018,697 A | * | 1/2000 | Morimoto et al. ............ | 701/411 |
| 6,064,941 A | * | 5/2000 | Nimura et al. ................ | 701/416 |
| 6,122,597 A | * | 9/2000 | Saneyoshi et al. ............ | 701/301 |
| 6,128,571 A | * | 10/2000 | Ito et al. ......................... | 701/426 |
| 6,173,232 B1 | * | 1/2001 | Nanba et al. .................. | 701/446 |
| 6,728,635 B2 | * | 4/2004 | Hamada et al. ............... | 701/431 |
| 7,149,625 B2 | * | 12/2006 | Mathews et al. .............. | 701/420 |
| 7,155,339 B2 | * | 12/2006 | Tu ................................. | 701/426 |
| 7,480,566 B2 | * | 1/2009 | Laverty ......................... | 701/426 |
| 7,783,422 B2 | * | 8/2010 | Tanaka .......................... | 701/436 |
| 8,285,481 B2 | * | 10/2012 | De Silva et al. ............... | 701/409 |
| 2001/0008991 A1 | * | 7/2001 | Hamada et al. ............... | 701/209 |
| 2002/0072848 A1 | * | 6/2002 | Hamada et al. ............... | 701/211 |
| 2002/0072849 A1 | * | 6/2002 | Endo et al. .................... | 701/211 |
| 2003/0018428 A1 | * | 1/2003 | Knockeart et al. ............ | 701/210 |
| 2003/0210807 A1 | * | 11/2003 | Sato et al. ...................... | 382/104 |

(Continued)

FOREIGN PATENT DOCUMENTS

CN 101833702 A 9/2010
CN 101874196 A 10/2010

(Continued)

OTHER PUBLICATIONS

Extended European Search Report issued Apr. 10, 2014, corresponds to European patent application No. 11189276.6.

(Continued)

*Primary Examiner* — Johnathan L Sample
(74) *Attorney, Agent, or Firm* — Lowe Hauptman & Ham, LLP

(57) ABSTRACT

In a guiding method, an object of interest existing in a vicinity of a guidance point, at which a driver of a vehicle needs guidance, on a travel path of the vehicle is retrieved. A recognizable range the driver will have is estimated based on at least one of (a) time required to provide guidance with respect to the object of interest and (b) time required for the driver to visually check the object of interest after receiving the guidance. The guidance with respect to the object of interest is provided when the object of interest exists in the estimated recognizable range.

20 Claims, 6 Drawing Sheets

(56) References Cited

U.S. PATENT DOCUMENTS

| | | | |
|---|---|---|---|
| 2005/0140524 A1* | 6/2005 | Kato et al. | 340/995.13 |
| 2005/0182564 A1* | 8/2005 | Kim | 701/211 |
| 2006/0047427 A1* | 3/2006 | Weed et al. | 701/220 |
| 2006/0178826 A1* | 8/2006 | Gomi | 701/211 |
| 2006/0190169 A1* | 8/2006 | Kawai | 701/211 |
| 2006/0253247 A1* | 11/2006 | de Silva et al. | 701/201 |
| 2007/0106460 A1* | 5/2007 | Nakayama et al. | 701/201 |
| 2007/0124068 A1* | 5/2007 | Nakayama et al. | 701/210 |
| 2007/0150169 A1* | 6/2007 | Tomita et al. | 701/117 |
| 2007/0250263 A1* | 10/2007 | Yamada | 701/207 |
| 2008/0010007 A1* | 1/2008 | Tomizawa | 701/206 |
| 2008/0016472 A1* | 1/2008 | Rohlf et al. | 715/848 |
| 2008/0046175 A1* | 2/2008 | Tengler et al. | 701/210 |
| 2008/0234933 A1* | 9/2008 | Chowdhary et al. | 701/213 |
| 2009/0041302 A1* | 2/2009 | Nagaoka et al. | 382/103 |
| 2009/0055094 A1* | 2/2009 | Suzuki | 701/209 |
| 2009/0125233 A1* | 5/2009 | Shibasaki | 701/208 |
| 2009/0125234 A1* | 5/2009 | Geelen et al. | 701/209 |
| 2009/0201176 A1* | 8/2009 | Shimada et al. | 340/944 |
| 2009/0319171 A1* | 12/2009 | Nakayama et al. | 701/201 |
| 2010/0049515 A1* | 2/2010 | Sumiyoshi et al. | 704/246 |
| 2010/0104174 A1* | 4/2010 | Rohlf et al. | 382/154 |
| 2010/0104199 A1* | 4/2010 | Zhang et al. | 382/199 |
| 2010/0156616 A1* | 6/2010 | Aimura et al. | 340/436 |
| 2010/0253775 A1* | 10/2010 | Yamaguchi et al. | 348/135 |
| 2010/0268451 A1* | 10/2010 | Choi | 701/201 |
| 2010/0268453 A1* | 10/2010 | Otani et al. | 701/201 |
| 2011/0004397 A1* | 1/2011 | Nagase | 701/119 |
| 2011/0071758 A1* | 3/2011 | Cho et al. | 701/211 |
| 2011/0320114 A1* | 12/2011 | Buxton et al. | 701/200 |
| 2012/0136505 A1* | 5/2012 | Mori et al. | 701/1 |

FOREIGN PATENT DOCUMENTS

| | | |
|---|---|---|
| JP | 10-177699 A | 6/1998 |
| JP | 11248477 A | 9/1999 |

OTHER PUBLICATIONS

Office Action mailed Jan. 21, 2014, corresponds to Japanese patent application No. 2010-267809.

* cited by examiner

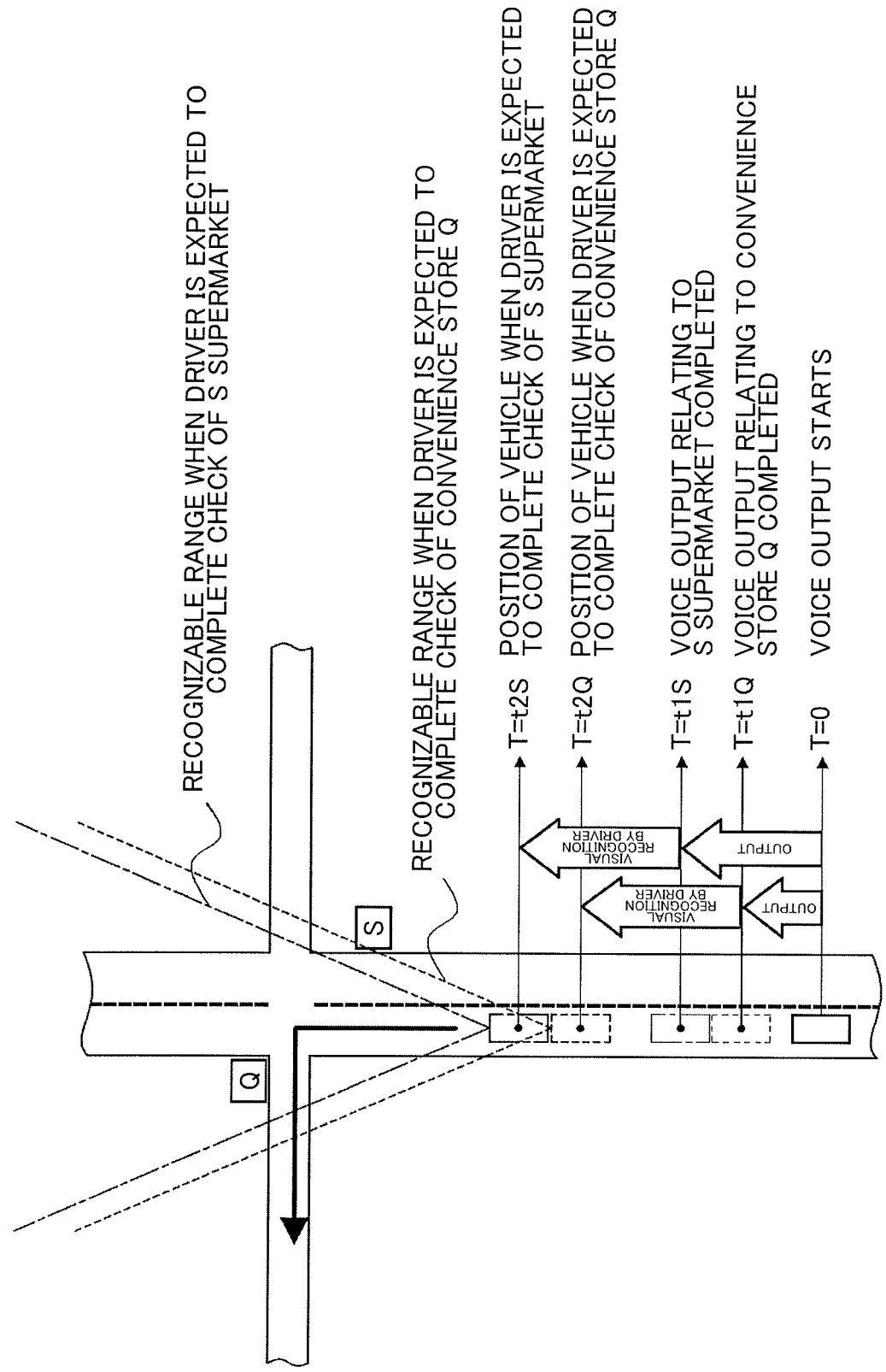

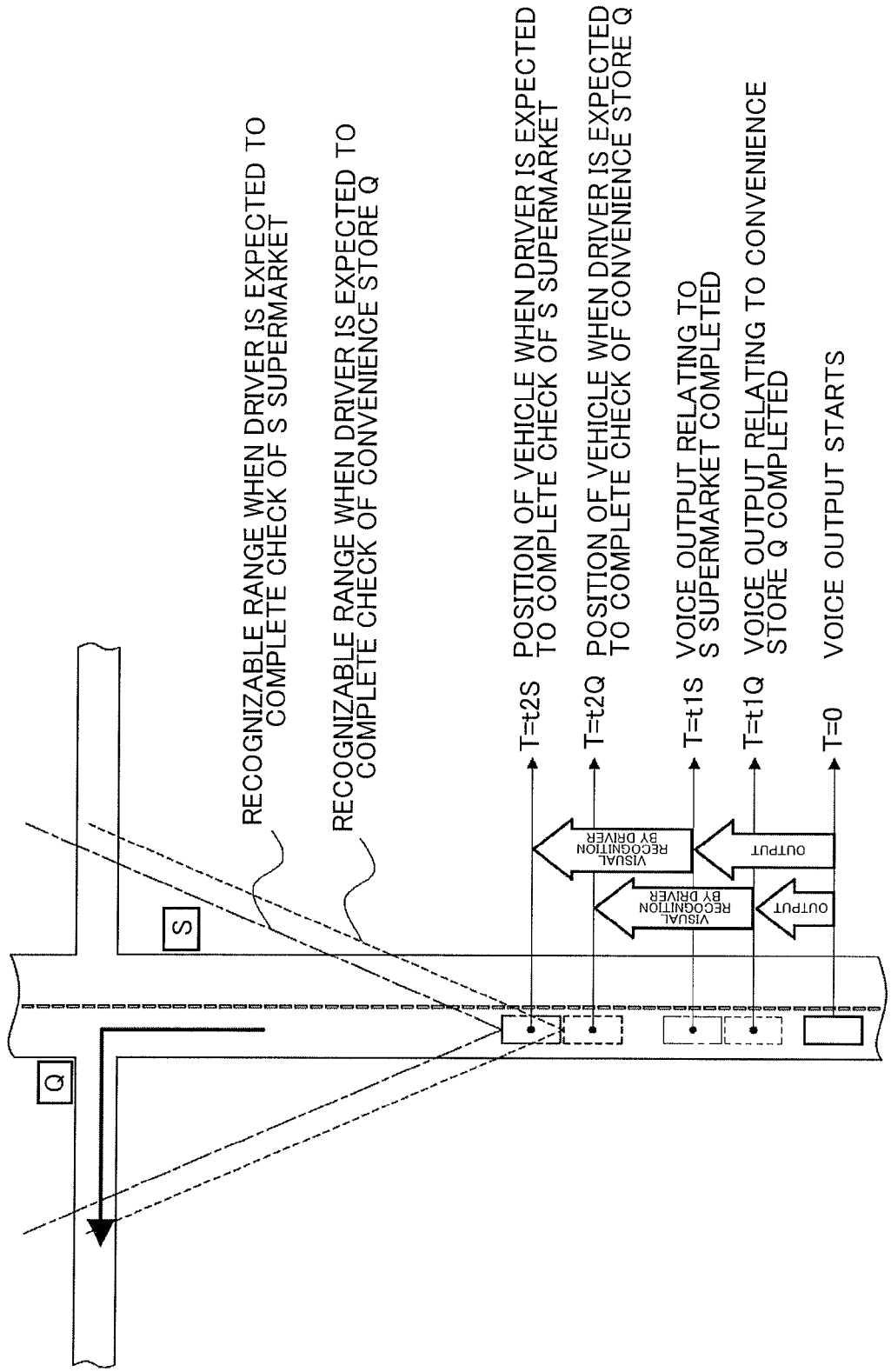

GUIDING APPARATUS, GUIDING METHOD, AND GUIDING PROGRAM PRODUCT

RELATED APPLICATION(S)

The disclosure of Japanese Patent Application No. 2010-267809 filed on Nov. 30, 2010 including the claims, specification, drawings and abstract is incorporated herein by reference in its entirety.

BACKGROUND

1. Technical Field

The present disclosure relates to guiding apparatuses, guiding methods, and guiding program products.

2. Description of the Related Art

Typical vehicle navigation systems for guiding drivers along travel paths of vehicles provide voice guidance on directions of travel, landmark buildings, and the like when the vehicles approach points such as intersections and junctions at which the drivers need guidance.

Recently, voice-guidance apparatuses for vehicles using image information have been proposed with the aim of guiding drivers using, in particular, features that the driver can actually recognize visually. Such voice-guidance apparatuses recognize features such as traffic lights to be used for voice guidance from results of images captured by vehicle-mounted cameras at positions before junctions, and output voice guidance including information relating to the features from voice synthesizers (for example, see Japanese Patent Application Publication No. JP-A-10-177699).

In the above-described conventional apparatuses, however, there is a possibility that the features may move out of ranges in which the drivers can recognize the features when the drivers attempt to check the features after the output of the voice guidance is completed since the time required to output the voice guidance including the information relating to the features is not taken into account. In this case, the drivers may not be able to find the features used for the voice guidance, and may experience uneasiness or take the wrong travel path.

SUMMARY

In accordance with a first aspect, a guiding apparatus comprises a vehicle-speed detecting unit, an object-candidate retrieving unit, a recognizable-range estimating unit, an object retrieving unit and a guidance control unit. The vehicle-speed detecting unit is arranged for detecting a speed of a vehicle. The object-candidate retrieving unit is arranged for retrieving a candidate object of interest existing in a vicinity of a guidance point, at which a driver of the vehicle needs guidance, on a travel path of the vehicle. The recognizable-range estimating unit is arranged for determining a guidance distance required to provide guidance with respect to the candidate object of interest on the basis of (i) the vehicle speed and (ii) guidance output time required to provide guidance with respect to the candidate object of interest. The recognizable-range estimating unit is further arranged for estimating a recognizable range of the driver after the vehicle travels the determined guidance distance. The object retrieving unit is arranged for retrieving, as an object of interest, the candidate object of interest when the candidate object of interest exists in the recognizable range estimated by the recognizable-range estimating unit. The guidance control unit is arranged for providing guidance with respect to the object of interest retrieved by the object retrieving unit.

In accordance with a second aspect, in a guiding method, a speed of a vehicle is detected. A candidate object of interest existing in a vicinity of a guidance point, at which a driver of the vehicle needs guidance, on a travel path of the vehicle is retrieved. A guidance distance required to provide guidance with respect to the candidate object of interest is determined on the basis of (i) the detected vehicle speed and (ii) guidance output time required to provide guidance with respect to the retrieved candidate object of interest. A recognizable range of the driver after the vehicle travels the determined guidance distance is estimated. When the candidate object of interest exists in the estimated recognizable range, the candidate object of interest is retrieved as an object of interest. Guidance is provided with respect to the retrieved object of interest.

In accordance with a third aspect, in a guiding method, an object of interest existing in a vicinity of a guidance point, at which a driver of a vehicle needs guidance, on a travel path of the vehicle is retrieved. A recognizable range the driver will have is estimated based on at least one of (a) time required to provide guidance with respect to the object of interest and (b) time required for the driver to visually check the object of interest after receiving the guidance. The guidance with respect to the object of interest is provided when the object of interest exists in the estimated recognizable range.

BRIEF DESCRIPTION OF THE DRAWINGS

FIG. 5 is a diagram that illustrates priorities of landmarks depending on their positions at a left turn on;

FIG. 6 is a diagram that illustrates the positions of landmarks and the respective recognizable ranges in a first situation; and FIG. 7 is a diagram that illustrates the positions of landmarks and the respective recognizable ranges in a second situation.

DETAILED DESCRIPTION

A guiding apparatus, a guiding method, and a guiding program product according to one or more embodiment of the present invention will now be described in detail with reference to the drawings. However, the present invention is not limited to the specifically described embodiment(s).

Structure

Figure 1:
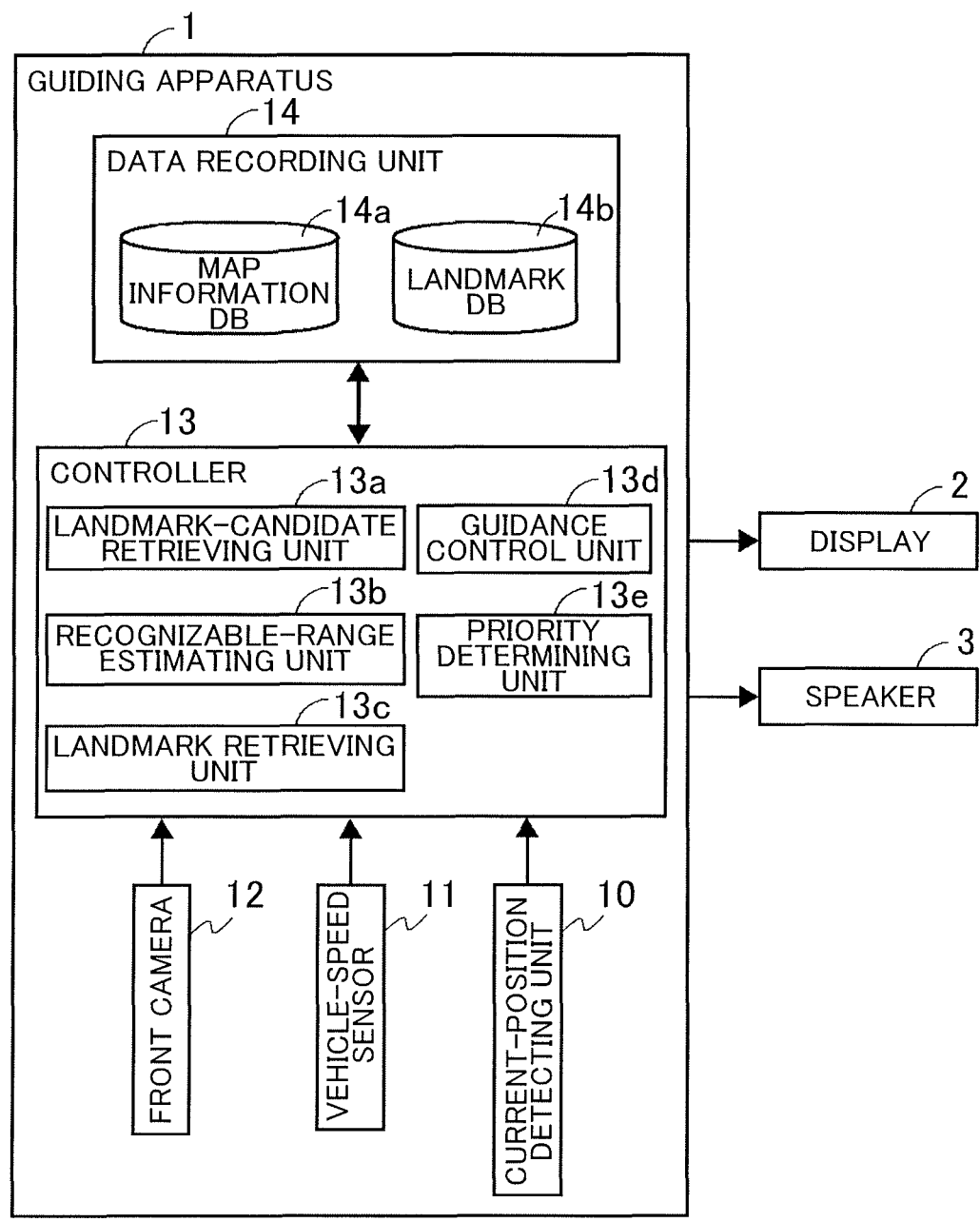
FIG. 1 is an exemplary block diagram of a guiding apparatus according to one or more embodiment.

First, the structure of a guiding apparatus 1 according to one or more embodiment will be described. FIG. 1 is an exemplary block diagram of the guiding apparatus 1. The guiding apparatus 1 is mounted on a vehicle, and includes a current-position detecting unit 10, a vehicle-speed sensor 11, a front camera 12, a controller 13, and a data recording unit 14 as shown in FIG. 1. In addition, the guiding apparatus 1 is connected to a display 2 and a speaker 3.

Structure—Guiding Apparatus—Current-Position Detecting Unit

The current-position detecting unit 10 detects the current position of the vehicle on which the guiding apparatus 1 is mounted. Specifically, the current-position detecting unit 10 includes at least one of a GPS, a geomagnetic sensor, a distance sensor, and a gyroscopic sensor (all not shown), and detects parameters such as the current position (coordinates) and the directions of the vehicle using known methods.

Structure—Guiding Apparatus—Vehicle-Speed Sensor

The vehicle-speed sensor 11 is a vehicle-speed detecting unit that detects the speed of the vehicle, and outputs, for example, a vehicle-speed pulse signal that is proportional to the number of revolutions of the axle, to the controller 13. A known vehicle-speed sensor can be used as the vehicle-speed sensor 11.

Structure—Guiding Apparatus—Front Camera

The front camera 12 captures images in front of the vehicle in the direction of travel. The front camera 12 is mounted on the vehicle, for example, near the front bumper, on the rear-view mirror, or on the ceiling inside the vehicle compartment near the windshield to capture images in front of the vehicle in the direction of travel. Data relating to the images captured by the front camera 12 is input to the controller 13. The front camera 12 may have any specific structure, and may be configured using, for example, a known image pickup device such as a CMOS image sensor and a CCD image sensor and known optical parts such as fish-eye lenses and prisms.

Structure—Guiding Apparatus—Controller

The controller 13 is a control unit that controls various functions of the guiding apparatus 1, and specifically, is a computer including a CPU (central processing unit), various programs (including basic control programs such as OSes (operating systems) and application programs that are executed on the OSes and that implement specific functions), and an internal memory such as a ROM (read-only memory) and/or a RAM (random-access memory) for storing the programs and various data. In particular, a guiding program according to one or more embodiment substantially functions as units of the controller 13 when installed and executed in the guiding apparatus 1. In some embodiment, one or more of the functions described herein is/are performed by specifically configured hardware (e.g., by one or more application specific integrated circuits or ASIC(s)) which is/are provided) separate from or in lieu of the CPU. Some embodiments incorporate more than one of the described functions in a single ASIC.

This controller 13 is programmed or hardware-implemented to include a landmark-candidate retrieving unit 13*a*, a recognizable-range estimating unit 13*b*, a landmark retrieving unit 13*c*, a guidance control unit 13*d*, and a priority determining unit 13*e*. The landmark-candidate retrieving unit 13*a* is an object-candidate retrieving unit that retrieves candidates for objects of interest (hereinafter such objects being referred to as "landmarks" and such candidates being referred to as "landmark candidates") existing in the vicinity of points, at which the driver needs guidance, on a travel path of the vehicle (hereinafter such points being referred to as "guidance points"). The recognizable-range estimating unit 13*b* estimates recognizable ranges of the driver. The landmark retrieving unit 13*c* is an object retrieving unit that retrieves landmarks from the landmark candidates existing in the respective recognizable ranges. The guidance control unit 13*d* performs control for providing guidance with respect to the landmarks retrieved by the landmark retrieving unit 13*c*. The priority determining unit 13*e* determines priorities of the landmarks. Details of operations performed by these units of the controller 13 will be described below.

Structure—Guiding Apparatus—Data Recording Unit

The data recording unit 14 is a recording unit that records programs and various data required for the guiding apparatus 1 to operate, and is configured using, for example, a magnetic recording medium such as a hard disk (not shown) serving as an external storage device. Any other recording media including semiconductor storage media such as flash memories and optical recording media such as DVDs and Blu-ray discs may be used instead of or in addition to the hard disk.

This data recording unit 14 includes a map information database 14*a* (hereinafter, the term "database" is abbreviated as "DB") and a landmark DB 14*b*.

The map information DB 14*a* is a map-information storage unit that stores map information. The map information includes, for example, link data (such as link numbers, connection node numbers, road coordinates, road types, road widths, number of traffic lanes, and driving restrictions), node data (node numbers and coordinates), feature data (such as traffic lights, road signs, guardrails, and buildings), facility data (such as positions of facilities and types of facilities), topographic data, and map display data for displaying maps on the display 2.

The landmark DB 14*b* is an object-information storage unit that stores guidance output time information used for determining time required to provide guidance with respect to landmarks. For example, this landmark DB 14*b* stores guidance output time information used for determining time required to provide voice output of names of features and facilities that can be landmarks (for example, features and facilities located near intersections and junctions) for each of the features and the facilities. The guidance output time information includes, for example, "four seconds" as time required to provide voice output of "S Supermarket" serving as a facility that can be a landmark.

Structure—Display

The display 2 is a display unit that displays various information on the basis of control by the guiding apparatus 1. The display 2 may have any specific structure, and may be configured using a known flat-panel display such as a liquid crystal display and an organic EL display.

Structure—Speaker

The speaker 3 is an output unit that outputs various voice on the basis of control by the guiding apparatus 1. The voice output from the speaker 3 may have any specific mode, and may be synthesized voice generated as required or voice recorded in advance.

Process

Figure 2:
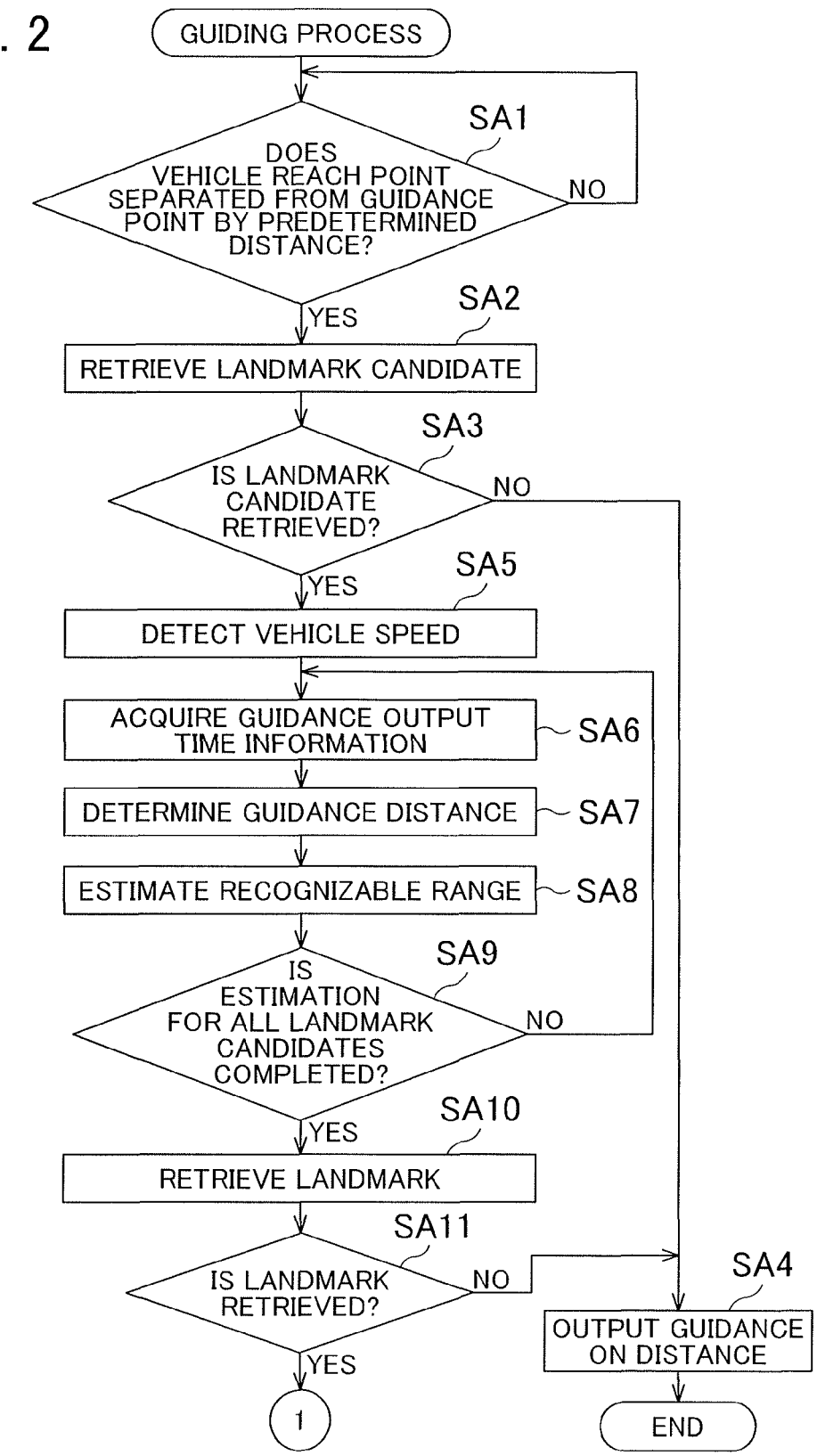
FIG. 2 is a flow chart of a first part of a guiding process.
Figure 3:
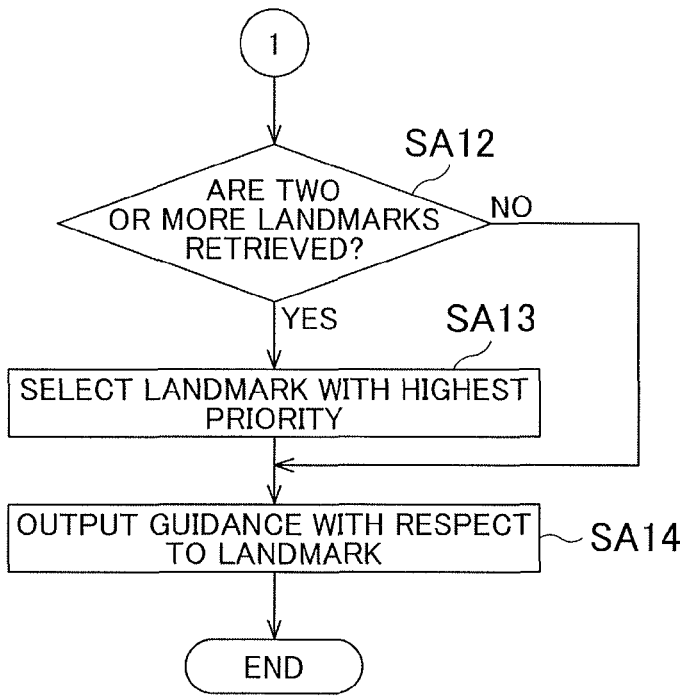
FIG. 3 is a flow chart of a second part of the guiding process subsequent to FIG. 2.

Next, a guiding process performed by the guiding apparatus 1 configured as above will be described. FIGS. 2 and 3 are flow charts of the guiding process. In the following description of each operation, "step" is abbreviated as "S". This guiding process is, for example, repeatedly started at predetermined periods after the guiding apparatus 1 is powered on. As a precondition for performing the guiding process, it is assumed that a travel path of the vehicle is set by a known navigation system.

As shown in FIG. 2, when the guiding process starts, the landmark-candidate retrieving unit 13*a* determines a guidance point, at which the driver needs guidance, on the travel path of the vehicle on the basis of the current position of the vehicle detected by the current-position detecting unit 10, and waits until the vehicle reaches a position separated from the guidance point by a predetermined distance (No in SA1). Herein, the guidance point, at which the driver needs guidance, on the travel path of the vehicle refers to a point at which the driver needs guidance to direct the vehicle in an appropriate direction. For example, the guidance point includes an intersection and a junction at which the driver needs to turn left or right on the travel path. A distance appropriate to, for example, perform the guiding process and output guidance on the guidance point (for example, 100 m) is set as the predetermined distance.

If the vehicle reaches the position separated from the guidance point by the predetermined distance (Yes in SA1), the landmark-candidate retrieving unit 13a searches for a landmark candidate existing in the vicinity of the guidance point determined in SA1 (SA2). For example, the landmark-candidate retrieving unit 13a refers to the map information DB 14a, and searches for a feature or a facility located within a range of a predetermined distance (for example, 30 m) from the guidance point as a landmark candidate.

Subsequently, the guidance control unit 13d determines whether or not a landmark candidate is retrieved by the landmark-candidate retrieving unit 13a in SA2 (SA3). If no landmark candidate is retrieved by the landmark-candidate retrieving unit 13a (No in SA3), that is, if no feature or facility that can be a landmark exists in the vicinity of the guidance point, the guidance control unit 13d outputs information on the distance from the current position of the vehicle to the guidance point from the speaker 3 and on the display 2 (SA4) since the guidance control unit 13d cannot provide guidance with respect to a landmark. For example, the guidance control unit 13d outputs guidance such as "In 30 meters, turn left" from the speaker 3 and on the display 2. Subsequently, the controller 13 ends the guiding process.

If a landmark candidate is retrieved by the landmark-candidate retrieving unit 13a (Yes in SA3), the recognizable-range estimating unit 13b detects the speed of the vehicle using the vehicle-speed sensor 11 (SA5).

Subsequently, the recognizable-range estimating unit 13b acquires guidance output time information corresponding to the landmark candidate retrieved by the landmark-candidate retrieving unit 13a in SA2 from the landmark DB 14b (SA6). That is, the recognizable-range estimating unit 13b refers to the landmark DB 14b to acquire the guidance output time information used for determining the time required to provide voice output of the name of the feature or the facility serving as the landmark candidate retrieved by the landmark-candidate retrieving unit 13a in SA2.

Next, the recognizable-range estimating unit 13b determines a distance (hereinafter referred to as "guidance distance") required to provide guidance with respect to the landmark candidate retrieved by the landmark-candidate retrieving unit 13a in SA2 (SA7). Specifically, the recognizable-range estimating unit 13b calculates a product of the vehicle speed detected using the vehicle-speed sensor 11 in SA5 and the time determined on the basis of the guidance output time information acquired from the landmark DB 14b by the recognizable-range estimating unit 13b in SA6 as the guidance distance required to provide guidance with respect to the landmark candidate. In this manner, a distance that the vehicle travels while the name of the feature or the facility serving as the landmark candidate is output by voice is calculated as the guidance distance.

Subsequently, the recognizable-range estimating unit 13b estimates a recognizable range of the driver (i.e., the view the driver will have) after the vehicle travels the guidance distance determined by the recognizable-range estimating unit 13b in SA7 (SA8). At this moment, the recognizable-range estimating unit 13b estimates the recognizable range while taking time required for the driver to check the landmark into account. Herein, a fixed value (for example, one second) recorded in the data recording unit 14 in advance, for example, is used as the "time required for the driver to check the landmark". Alternatively, the "time required for the driver to check the landmark" may be a learned value obtained by learning the time required for the driver to check the landmark based on a line of sight of the driver detected using a known sight-line detecting camera. Alternatively, a value that varies depending on, for example, the position of the landmark candidate retrieved by the landmark-candidate retrieving unit 13a in SA2 (for example, whether the landmark candidate is to the left or to the right of the vehicle in the direction of travel) or existence of obstacles between the landmark candidate and the vehicle (for example, barriers or plants contained in median strips) may be used as the time required for the driver to check the landmark. That is, for example, when vehicles are driven on the left-hand side of the road and the landmark candidate is to the right of the vehicle in the direction of travel, it may take some time for the driver to check the landmark due to the existence of oncoming vehicles between the vehicle and the landmark candidate. Therefore, the time required for the driver to check the landmark is set longer than that when the landmark candidate is to the left of the vehicle in the direction of travel. In addition, for example, when a barrier exists in a median strip between the landmark candidate and the vehicle, it may take some time for the driver to check the landmark over the barrier. Therefore, the time required for the driver to check the landmark is set longer than that when no obstacles exist between the landmark candidate and the vehicle. Herein, the term "recognizable range" refers to a range in which the driver can visually recognize the landmark. For example, the recognizable-range estimating unit 13b estimates the recognizable range as an image obtained by excluding a peripheral area having a width corresponding to the guidance distance determined by the recognizable-range estimating unit 13b in SA7 from an image captured by the front camera 12. In some embodiments, the recognizable-range estimating unit 13b estimates the recognizable range as an image obtained by excluding (i) a peripheral area having a width corresponding to the guidance distance determined by the recognizable-range estimating unit 13b in SA7 as well as (ii) a subsequent peripheral area having a width corresponding to the time required for the driver to check the landmark from an image captured by the front camera 12.

Figure 4:
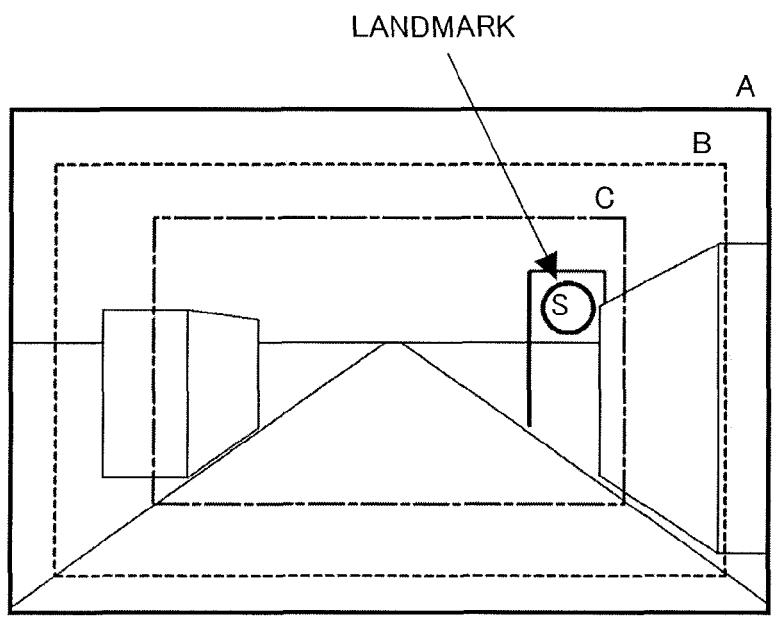
FIG. 4 is a diagram that illustrates an image captured by a front camera and a recognizable range.

FIG. 4 illustrates an image captured by the front camera 12. In FIG. 4, the outermost frame A in the image captured by the front camera 12 at the current position of the vehicle. A peripheral area between the frame A and a frame B inside the frame A represents an area that will be unrecognizable to the driver since the area will be out of sight of the driver as the vehicle travels the guidance distance determined by the recognizable-range estimating unit 13b in SA7 while the name of the feature or the facility serving as the landmark candidate is output by voice. A subsequent peripheral area between the frame B and a frame C inside the frame B represents an area that will be unrecognizable by the driver since the area will be out of sight of the driver as the vehicle travels while the driver, having heard the voice guidance with respect to the landmark ("S Supermarket" in FIG. 4) output from the speaker 3, checks the landmark. Herein, the distance (between frames B and C) that the vehicle travels while the driver checks the landmark is defined as a product of the vehicle speed detected using the vehicle-speed sensor 11 in SA5 and the time required for the driver to check the landmark (for example, one second), and is calculated by the recognizable-range estimating unit 13b.

For example, the correspondent relationship between the distance that the vehicle travels and the area that will be unrecognizable by the driver in the image captured by the front camera 12 after the vehicle travels the distance is stored in the data recording unit 14 in advance. The recognizable-range estimating unit 13b refers to the data recording unit 14, and determines the frame C corresponding to a total distance of the guidance distance determined by the recognizable-range estimating unit 13b in SA7 and the distance that the vehicle travels while the driver checks the landmark. Subsequently, the recognizable-range estimating unit 13b estimates an image obtained by excluding the area between the frames A and C from the image captured by the front camera 12 (that is, the image inside the frame C) as the recognizable range. Herein, in the example shown in FIG. 4, the landmark "S Supermarket" is located within the recognizable range.

Returning to FIG. 2, in cases where the landmark-candidate retrieving unit 13a retrieves two or more landmark candidates in SA2, the recognizable-range estimating unit 13b repeats the operations of SA6 to SA9 until recognizable ranges corresponding to all the landmark candidates are estimated in SA8 (No in SA9).

If the recognizable-range estimating unit 13b estimates the recognizable ranges corresponding to all the landmark candidates retrieved by the landmark-candidate retrieving unit 13a in SA2 in SA8 (Yes in SA9), the landmark retrieving unit 13c searches for a landmark from the landmark candidates that are retrieved by the landmark-candidate retrieving unit 13a in SA2 and exist in the respective recognizable ranges estimated by the recognizable-range estimating unit 13b in SA8 (SA10).

Subsequently, the guidance control unit 13d determines whether a landmark is retrieved by the landmark retrieving unit 13c in SA10 (SA11). If no landmark is retrieved by the landmark retrieving unit 13c (No in SA11), that is, no landmarks exist in the respective recognizable ranges estimated by the recognizable-range estimating unit 13b, the guidance control unit 13d outputs information on the distance from the current position of the vehicle to the guidance point from the speaker 3 and the display 2 (SA4) since the driver may not be able to find the landmarks even when voice guidance with respect to the landmarks is provided. Subsequently, the controller 13 ends the guiding process.

If the landmark retrieving unit 13c retrieves one or more landmarks (Yes in SA11), the process proceeds to operations shown in FIG. 3, and the guidance control unit 13d determines whether or not two or more landmarks are retrieved by the landmark retrieving unit 13c (SA12).

Figure 5:
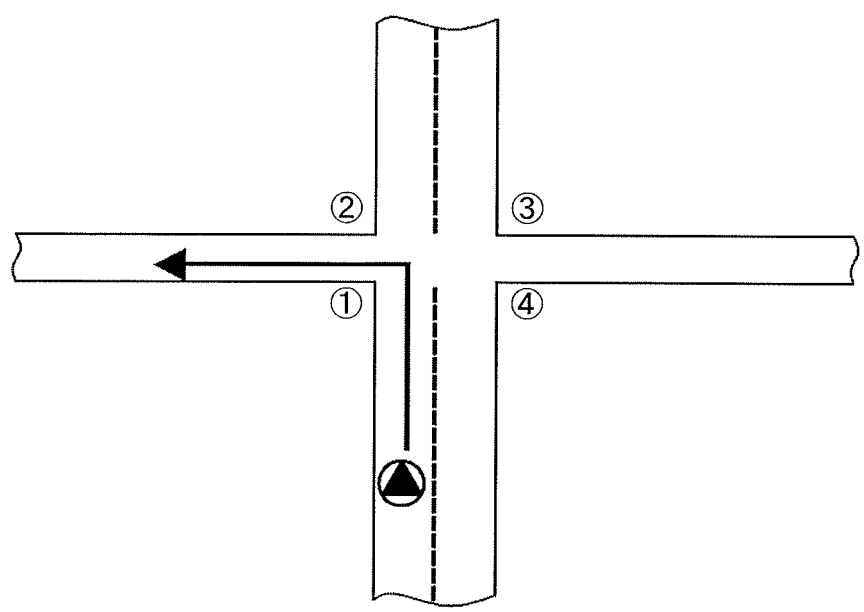

If two or more landmarks are retrieved by the landmark retrieving unit 13c (Yes in SA12), the guidance control unit 13d causes the priority determining unit 13e to determine the priorities of the landmarks, and selects a landmark with the highest priority determined by the determining unit 13e (SA13). The priorities of the landmarks depending on the positions thereof are stored in the data recording unit 14 in advance for, for example, each combination of the types of the guidance points such as crossroads and T-junctions and guidance details such as right turns and left turns. The priority determining unit 13e refers to the data recording unit 14 to determine the priorities corresponding to the combinations of the types of the guidance points and the guidance details at the guidance points and the positions of the landmarks retrieved by the landmark retrieving unit 13c. FIG. 5 illustrates the priorities of the landmarks depending on the positions thereof when a travel path along which the vehicle turns left at crossroads is set. In the example shown in FIG. 5, the left proximal corner of the crossroads when viewed from the current position of the vehicle is given the highest priority (priority "1") among the landmarks existing in the vicinity of the crossroads, and the priorities fall in the order of the left distal corner (priority "2"), the right distal corner (priority "3"), and then the right proximal corner (priority "4") of the crossroads. The priorities of the landmarks depending on the positions thereof are not limited to the example shown in FIG. 5, and may be set without restrictions.

Returning to FIG. 3, the guidance control unit 13d outputs guidance with respect to the landmark that is selected by the guidance control unit 13d in SA13 from the speaker 3 and the display 2 (SA14) after the operation in SA13. If two or more landmarks are not retrieved by the landmark retrieving unit 13c, that is, only one landmark is retrieved by the landmark retrieving unit 13c as a result of determination in SA12 (No in SA12), guidance with respect to the landmark is output from the speaker 3 and the display 2 (SA14). Subsequently, the controller 13 ends the guiding process.

FIGS. 6 and 7 illustrate the positions of landmarks and the respective recognizable ranges. In the example shown in FIG. 6, the current position of the vehicle is indicated by T=0. An image captured by the front camera 12 at T=0 is similar to that inside frame A of FIG. 4. The time required to provide guidance with respect to a landmark "Convenience Store Q" is t1Q. The guidance distance with respect to the landmark "Convenience Store Q" is the distance between T=0 and T=t1Q. At T=t1Q, the driver will have a view similar to that inside frame B of FIG. 4. The time required for the driver to check the landmark "Convenience Store Q" is the difference between t2Q and t1Q. The vehicle will travel the distance between T=t1Q and T=t2Q while the driver is checking the landmark "Convenience Store Q" after receiving (e.g., hearing) the outputted guidance. At T=t2Q, the driver will have a view similar to that inside frame C of FIG. 4. As illustrated in FIG. 6, the landmark "Convenience Store Q" located at the left distal corner of crossroads exists in a recognizable range of the driver (an area inside dotted lines in FIG. 6) at a point in time when the driver is expected to have completed his/her check of the landmark "Convenience Store Q" (T=t2Q in FIG. 6) after the output of the voice guidance with respect to the landmark "Convenience Store Q" has been completed (T=t1Q in FIG. 6).

Meanwhile, a landmark "S Supermarket" located at the right proximal corner of the crossroads does not exist in a recognizable range of the driver (an area inside alternate long and short dash lines in FIG. 6) at a point in time when the driver is expected to have completed his/her check of the landmark "S Supermarket" (T=t2S in FIG. 6) after the output of the voice guidance with respect to the landmark "S Supermarket" has been completed (T=t1S in FIG. 6). In this case, the landmark retrieving unit 13c retrieves the landmark "Convenience Store Q" that exists in the recognizable range in SA10 in FIG. 2, and the guidance control unit 13d outputs guidance with respect to the landmark "Convenience Store Q" (for example, "turn left at the corner of Convenience Store Q") from the speaker 3 and the display 2 in SA14 in FIG. 3.

In the example shown in FIG. 7, a landmark "Convenience Store Q" located at the left distal corner of the crossroads exists in a recognizable range of the driver (an area inside dotted lines in FIG. 7) at a point in time when the driver is expected to have completed his/her check of the landmark "Convenience Store Q" (T=t2Q in FIG. 7) after the output of the voice guidance with respect to the landmark "Convenience Store Q" has been completed (T=t1Q in FIG. 7). A landmark "S Supermarket" located at the right proximal corner of the crossroads also exists in a recognizable range of the driver (an area inside alternate long and short dash lines in FIG. 7) at a point in time when the driver is expected to have completed his/her check of the landmark "S Supermarket" (T=t2S in FIG. 7) after the output of the voice guidance with respect to the landmark "S Supermarket" has been completed (T=t1S in FIG. 7). In this case, the landmark retrieving unit 13c retrieves both the landmarks "Convenience Store Q" and "S Supermarket" that exist in the respective recognizable ranges in SA10 in FIG. 2. According to the example shown in FIG. 5, the landmark "Convenience Store Q" has the highest priority of the landmarks "Convenience Store Q" and "S Supermarket". Accordingly, the guidance control unit 13d selects the landmark "Convenience Store Q" in SA13 in FIG. 3, and outputs guidance with respect to the landmark "Convenience Store Q" from the speaker 3 and the display 2 in SA14.

Effects

According to one or more of the above-described embodiments, the recognizable-range estimating unit 13b estimates the recognizable ranges of the driver after the vehicle travels the guidance distances required to provide guidance with respect to the landmark candidates, the landmark retrieving unit 13c retrieves the landmark from the landmark candidates existing in the respective recognizable ranges estimated by the recognizable-range estimating unit 13b, and the guidance control unit 13d performs control for providing guidance with respect to the landmark retrieved by the landmark retrieving unit 13c. With this, the driver can be provided with guidance with respect to a landmark that the driver can find without fail after completion of the guidance with respect to the landmark, and can be guided along an appropriate travel path without experiencing uneasiness.

In particular, in cases where the recognizable-range estimating unit 13b estimates images obtained by excluding the areas corresponding to the guidance distances from the image captured by the front camera 12 as the recognizable ranges, it can be determined whether or not guidance with respect to the landmark candidates is provided on the basis of whether or not the driver can actually recognize the landmark candidates visually.

In addition, in cases where the recognizable-range estimating unit 13b estimates the recognizable ranges on the basis of the time required for the driver to check the landmarks, the driver can be provided with guidance with respect to the landmarks that the driver can find more reliably, and can be guided along an appropriate travel path without experiencing uneasiness.

When the landmark retrieving unit 13c retrieves two or more landmarks, the guidance control unit 13d performs control for providing guidance with respect to the landmark with the highest priority determined by the priority determining unit 13e among the landmarks. With this, the driver can be provided with guidance with respect to the landmark that the driver can find without fail and that is the most suitable for the guidance along a travel path, and can be guided along an appropriate travel path without experiencing uneasiness.

Modifications

Although exemplary embodiments of the present invention have been described in detail, the present invention is not limited to the embodiments described above, and may be implemented in various modifications which will be exemplarily described below.

Landmark DB

The landmark DB 14b stores the guidance output time information used for determining the time required to provide voice output of the names of the features and the facilities that can be landmarks for each of the features and the facilities in one or more of the above-described embodiments. Alternatively or additionally, the recognizable-range estimating unit 13b may calculate, at SA6 in FIG. 2, the time required to provide guidance with respect to the landmarks on the basis of, for example, the names (or identifying descriptions) of the landmarks stored in the landmark DB 14b.

Guiding Process

Although the recognizable-range estimating unit 13b estimates the images obtained by excluding the areas corresponding to the guidance distances determined by the recognizable-range estimating unit 13b from the image captured by the front camera 12 as the recognizable ranges in one or more of the above-described embodiments, the recognizable ranges may be estimated using other methods. For example, in a map used for guidance along the travel path, an area within a range of a predetermined angle centered about the direction of travel of the vehicle may be estimated as a recognizable range. In this case, the landmark retrieving unit 13c retrieves landmarks from the landmarks existing in the recognizable range on the basis of the positional information relating to the landmarks included in the map information.

In some embodiments, the recognizable-range estimating unit 13b estimates the recognizable range of the driver with respect to a landmark candidate based on either (a) the time required to provide guidance with respect to the landmark candidate or (b) the time required for the driver to check the landmark candidate. In further embodiments, the recognizable-range estimating unit 13b estimates the recognizable range of the driver with respect to a landmark candidate based on both (a) the time required to provide guidance with respect to the landmark candidate and (b) the time required for the driver to check the landmark candidate.

In some embodiments, a program product is provided with a non-transitory computer readable recording medium that stores a guiding program as described herein. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

What is claimed is:

1. A guiding apparatus, comprising:
a vehicle-speed detecting unit for detecting a speed of a vehicle;
an object-candidate retrieving unit for retrieving a candidate object of interest existing in a vicinity of a guidance point, at which a driver of the vehicle needs guidance, on a travel path of the vehicle;
a recognizable-range estimating unit for
determining a guidance distance required to provide guidance with respect to the candidate object of interest on the basis of (i) the vehicle speed detected by the vehicle-speed detecting unit and (ii) guidance output time required to provide guidance with respect to the candidate object of interest retrieved by the object-candidate retrieving unit, and
estimating a recognizable range the driver will have after the vehicle travels the determined guidance distance from a start of output of the guidance with respect to the candidate object of interest and before the vehicle reaches the guidance point, wherein the candidate object of interest is visually recognizable by the driver when the candidate object of interest exists in the recognizable range;
an object retrieving unit for retrieving, as an object of interest, the candidate object of interest when the candidate object of interest exists in the recognizable range estimated by the recognizable-range estimating unit; and
a guidance control unit for providing guidance with respect to the object of interest retrieved by the object retrieving unit.

2. The guiding apparatus according to claim 1, further comprising:

a camera for capturing an image in front of the vehicle in a direction of travel of the vehicle,
wherein
the recognizable-range estimating unit is arranged to estimate, as the recognizable range, an image obtained by excluding an area corresponding to the guidance distance from the image captured by the camera.

3. The guiding apparatus according to claim 1, wherein the recognizable-range estimating unit is arranged to estimate the recognizable range on the basis of time required for the driver to visually check the object of interest.

4. The guiding apparatus according to claim 1, further comprising:
a priority determining unit,
wherein in response to a plurality of objects of interest retrieved by the object retrieving unit,
the priority determining unit is arranged to determine priorities of the plurality of objects of interest retrieved by the object retrieving unit, and
the guidance control unit is arranged to provide guidance with respect to one of the objects of interest with a highest priority determined by the priority determining unit among the plurality of objects of interest.

5. The guiding apparatus according to claim 1, further comprising:
a current-position detecting unit for detecting a current position of the vehicle used for determining the guidance point, at which the driver of the vehicle needs guidance, on the travel path of the vehicle.

6. The guiding apparatus according to claim 1, further comprising:
an object-information storage unit for storing guidance output time information used for determining the guidance output time required to provide guidance with respect to the candidate object of interest.

7. The guiding apparatus according to claim 1, wherein the recognizable-range estimating unit is arranged to calculate the guidance output time required to provide guidance with respect to the candidate object of interest.

8. The guiding apparatus according to claim 7, wherein the recognizable-range estimating unit is arranged to calculate the guidance output time based on a name or identifying description of the candidate object of interest.

9. The guiding apparatus according to claim 1, wherein the recognizable-range estimating unit is arranged to estimate the recognizable range, in a map used for guidance along the travel path, as an area within a predetermined angle centered about a direction of travel of the vehicle.

10. The guiding apparatus according to claim 1, further comprising:
a camera for capturing an image in front of the vehicle in a direction of travel of the vehicle,
wherein
the recognizable-range estimating unit is arranged to estimate, as the recognizable range, an image obtained by excluding, from the image captured by the camera, (i) an area corresponding to the guidance distance and (ii) a further area corresponding to time required for the driver to visually check the candidate object of interest.

11. The guiding apparatus according to claim 10, wherein the time required for the driver to visually check the candidate object of interest is a fixed value.

12. The guiding apparatus according to claim 10, wherein the time required for the driver to visually check the candidate object of interest is a learned value based on a line of sight of the driver.

13. The guiding apparatus according to claim 10, wherein the time required for the driver to visually check the candidate object of interest is a variable value depending on a position of the candidate object of interest with respect to a direction of travel of the vehicle or existence of obstacles between the candidate object of interest and the vehicle.

14. A guiding method performed by a guiding apparatus, the guiding apparatus having a vehicle-speed detecting unit and a controller, the method comprising:
detecting, by the vehicle-speed detecting unit, a speed of a vehicle;
retrieving, by the controller, a candidate object of interest existing in a vicinity of a guidance point, at which a driver of the vehicle needs guidance, on a travel path of the vehicle;
determining, by the controller, a guidance distance required to provide guidance with respect to the candidate object of interest on the basis of (i) the detected vehicle speed and (ii) guidance output time required to provide guidance with respect to the retrieved candidate object of interest;
estimating, by the controller, a recognizable range the driver will have after the vehicle travels the determined guidance distance from a start of output of the guidance with respect to the candidate object of interest and before the vehicle reaches the guidance point, wherein the candidate object of interest is visually recognizable by the driver when the candidate object of interest exists in the recognizable range;
retrieving, as an object of interest, the candidate object of interest when the candidate object of interest exists in the estimated recognizable range; and
providing, by the controller, guidance with respect to the retrieved object of interest.

15. The method according to claim 14, further comprising:
capturing, by a camera, an image in front of the vehicle in a direction of travel of the vehicle,
wherein the recognizable range is estimated as an image obtained by excluding an area corresponding to the guidance distance from the image captured by the camera.

16. The method according to claim 14, wherein
the recognizable range is estimated on the basis of time required for the driver to visually check the object of interest.

17. The method according to claim 14, further comprising, in response to a plurality of retrieved objects of interest,
determining priorities of the plurality of retrieved objects of interest; and
providing guidance with respect to one of the objects of interest with a highest priority among the plurality of retrieved objects of interest.

18. The guiding apparatus according to claim 14, further comprising:
detecting, by a current-position detecting unit of the guiding apparatus, a current position of of the vehicle; and
determining, by the controller, the guidance point on the basis of the detected current position.

19. A guiding program product, comprising a non-transitory computer-readable recording medium containing therein a guiding program for, when executed by a controller, causing the controller to execute a guiding method, the guiding method comprising:

retrieving a candidate object of interest existing in a vicinity of a guidance point, at which a driver of a vehicle needs guidance, on a travel path of the vehicle;

determining a guidance distance required to provide guidance with respect to the candidate object of interest on the basis of (i) a detected speed of the vehicle and (ii) guidance output time required to provide guidance with respect to the retrieved candidate object of interest;

estimating a recognizable range the driver will have after the vehicle travels the determined guidance distance from a start of output of the guidance with respect to the candidate object of interest and before the vehicle reaches the guidance point, wherein the candidate object of interest is visually recognizable by the driver when the candidate object of interest exists in the recognizable range;

retrieving, as an object of interest, the candidate object of interest when the candidate object of interest exists in the estimated recognizable range; and providing guidance with respect to the retrieved object of interest.

20. A guiding method performed by a controller, the method comprising:

retrieving, by the controller, a landmark of interest existing in a vicinity of a guidance point, at which a driver of a vehicle needs guidance, on a travel path of the vehicle;

estimating, by the controller, a recognizable range the driver will have from a start of output of the guidance with respect to the landmark of interest and before the vehicle reaches the guidance point, wherein the landmark of interest is visually recognizable by the driver when the landmark of interest exists in the recognizable range;

providing, by the controller, the guidance with respect to the landmark of interest when the landmark of interest exists in the estimated recognizable range.

* * * * *